United States Patent [19]

Forsthuber et al.

[11] Patent Number: 4,730,664
[45] Date of Patent: Mar. 15, 1988

[54] COOLING SYSTEM FOR COOLING A LIQUID COOLANT IN AN IMMERSIBLE MOTOR VEHICLE

[75] Inventors: Peter Forsthuber, Klosterneuburg; Erhard Kauer, Schützen am Gebirge, both of Austria

[73] Assignee: Steyr-Daimler-Puch AG, Vienna, Austria

[21] Appl. No.: 916,883

[22] Filed: Oct. 9, 1986

[30] Foreign Application Priority Data

Oct. 28, 1985 [AT] Austria ................ 3102/85

[51] Int. Cl.⁴ .................. F01P 7/00; B63B 35/00; B63H 21/38; B60K 11/04
[52] U.S. Cl. ..................... 165/41; 165/51; 180/68.4; 440/88; 114/270; 123/41.02; 123/41.51
[58] Field of Search ............... 165/41, 51; 180/68.4; 440/88; 114/270; 123/41.02, 41.51

[56] References Cited

U.S. PATENT DOCUMENTS

| 2,341,165 | 2/1944 | Todd | 114/270 |
| 2,390,557 | 12/1945 | Scaife | 180/68.4 |
| 2,397,792 | 4/1946 | Kramer et al. | 440/88 |
| 3,763,953 | 10/1973 | Yoda et al. | 123/41.51 |
| 4,579,090 | 4/1986 | Konrath et al. | 165/41 |

FOREIGN PATENT DOCUMENTS

| 1804607 | 5/1970 | Fed. Rep. of Germany . | |
| 2235183 | 9/1980 | Fed. Rep. of Germany | 180/68.4 |
| 707593 | 4/1954 | United Kingdom | 123/41.51 |
| 0737253 | 5/1980 | U.S.S.R. | 114/270 |

Primary Examiner—Albert W. Davis, Jr.
Assistant Examiner—John K. Ford
Attorney, Agent, or Firm—Marmorek, Guttman & Rubenstein

[57] ABSTRACT

In a cooling system for floatable and/or submersible motor vehicles having a liquid-cooled engine the radiator (1) is accommodated in a chamber (2), which during land travel is flown through by air supplied by a fan (V) and which admits water when the vehicle is submerged or floating. In order to decrease the loss of buoyancy when the vehicle is floating or submerged and to reduce any lateral shifting of weight, the chamber (2) contains a partition (5), which divides the heat exchange surfaces of the radiator into two sections at least on the cold side. The air supply duct (6) opens into the preferably larger compartment (2a), which is disposed on one side of the partition and provided with flow passages (8), which lead to the outside and are adapted to be closed. The other compartment (2b) is preferably smaller and is adapted to be shut off from the compartment (2a) and is the only compartment which is floodable.

20 Claims, 5 Drawing Figures

COOLING SYSTEM FOR COOLING A LIQUID COOLANT IN AN IMMERSIBLE MOTOR VEHICLE

BACKGROUND OF THE INVENTION

1. Field of the Invention

This invention relates to a cooling system for cooling a liquid coolant in an immersible motor vehicle, particularly to a cooling system for a floatable or submersible motor vehicle having a liquid-cooled engine, wherein a radiator is accommodated in a chamber, which is flown through by air during land travel and admits water when the vehicle is submerged or floating.

2. Description of the Prior Art

A known cooling system of that kind has been disclosed in Published German Application No. 1,804,607. In that known system, the chamber which accommodates the radiator is disposed above the engine, and the radiator and fan are disposed in said chamber one beside the other under a grating. Openings which are adapted to be closed by valve flaps are provided on opposite sides of the chamber and communicate with the engine-transmission compartment. During land travel, the two valve flaps are open and the fan sucks part of the air directly via a short circuit and causes another part of the air to flow through one opening of the chamber and around the engine-transmission assembly and through the other opening. When the vehicle is floating or submerged and the two valve flaps are closed so that liquid is not admitted to the engine-transmission compartment and only the chamber above said compartment is flooded. That known cooling system has various disadvantages. As the vehicle is immersed into the water, the chamber which accommodates the radiator and the fan is entirely filled with water so that the overall weight of the vehicle is considerably increased and its ability to float is reduced to some extent. If the entire assembly is not centered in the vehicle but is laterally offset, the vehicle may become overbalanced toward one side so that it assumes an oblique position. It will also be unfavorable to expose the fan to the entering water. Special measures must be adopted to ensure that the water will be drained out of the chamber when the vehicle has surfaced. It will obviously impossible to cool the radiator for the engine with both air and water when only part of the pan is immersed.

SUMMARY OF THE INVENTION

For this reason it is an object of the invention to eliminate said disadvantages and so to improve the cooling system described first hereinbefore that the buoyancy will be only slightly decreased and any displacement of weight occurring when the vehicle is floating or submerged will be only small, and that the space requirement will be only slightly larger than that of a radiator which is cooled only by air. The latter aspect is of special importance is small vehicles.

The object set forth is accomplished in accordance with the invention in that the chamber contains a partition, by which the heat exchange surfaces of the radiator are divided into two sections at least on the cold side, an air supply duct opens into one, preferably larger, compartment, which is disposed on one side of the partition, said one compartment is provided with flow passages which lead to the outside and are all adapted to be closed, and the other compartment is adapted to be shut off from said one compartment and is preferably smaller and is adapted to be flooded alone.

Owing to that arrangement said one compartment, which is preferably larger, is sealed and will not admit water when the vehicle is floating or submerged. Only the smaller compartment is flooded so that the increase in weight and the above-described results of such increase will be only small. The invention is based on the recognition that the heat exchange surface area which is required for a cooling of the liquid coolant for the engine by the external water will be much smaller than the heat exchange surface area which is required when said the heat exchange surfaces are cooled by the air which is delivered by the fan. As a result, both compartments are supplied with air during land travel and only the smaller compartment is flooded during travel on or in water. Owing to the provision of the partition and the possibility to shut off the two compartments from each other, a combined cooling can be effected under certain conditions of travel in that the radiator for cooling the engine is cooled only with air in one compartment and only with external water in the other compartment. Because the air supply duct opens only into that compartment which is adapted to be shut off from the outside, the fan will not be contacted by water so that a simple fan can be used and special sealing measures need not be adopted. It will be understood that the radiator need not be used to cool the liquid coolant for the engine but the radiator may alternatively communicate with an oil cooler or with a charge air cooler.

The partition may consist of a closed box and the open ends of tubes which constitute the two sections of the heat exchange surfaces may be sealed in the broadside walls of said box. That arrangement will result in a particularly simple radiator structure in which the entire coolant is cooled in the flooded compartment during travel on or in water. Alternatively, the partition may be parallel to the tubes which constitute the radiator and which are preferred connected in parallel. In that case only those tubes which extend through the flooded compartment will be used for a heat exchange when the vehicle is floating or submerged.

The flooding of one compartment, which is preferably the smaller compartment, might by effected by a mere communication through a low-level supply pipe as the vehicle is immersed. In order to ensure that the compartment will be flooded quickly, the floodable compartment is connected to the discharge line from a water pump and is provided with a water drain.

In accordance with the invention a valve flap is provided for shutting off the floodable compartment from the other compartment and said valve flap in an open position serves as an air-guiding wall and optionally closes the pump discharge line and/or the water drain at the same time so that said valve flap has a dual function.

DETAILED DESCRIPTION OF THE PREFERRED EMBODIMENTS

Figure 1:
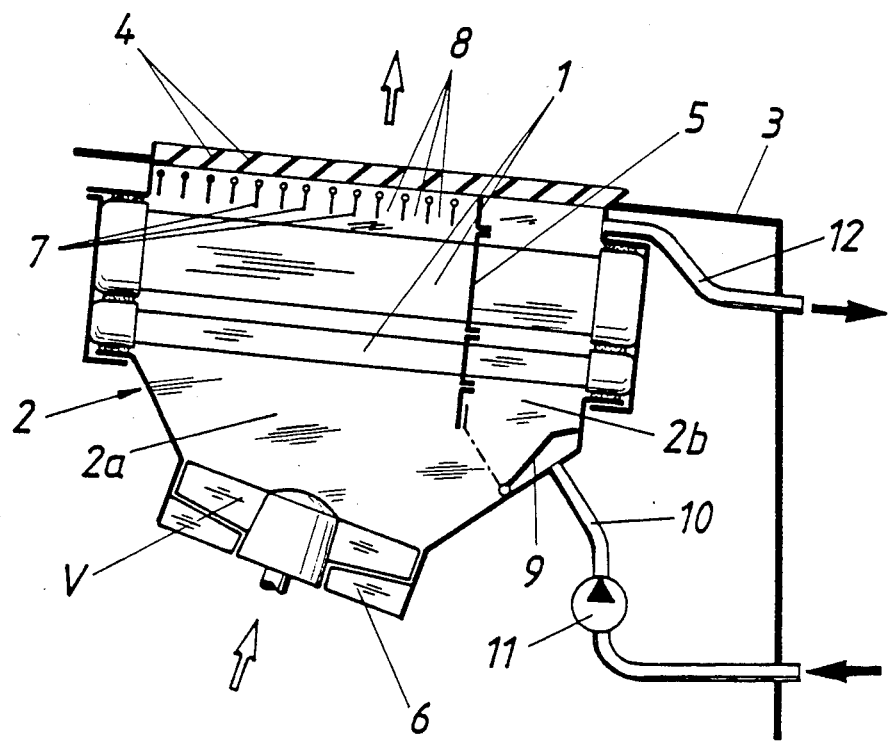
FIG. 1 is a vertical sectional view showing those components of the cooling system which are essential for the invention.

The invention is illustrated strictly diagrammatically and by way of example on the drawing.

A radiator 1 for a liquid-cooled engine, not shown, of a motor vehicle which is adapted to float and/or dive is accommodated in a chamber 2 provided in the body 3 of the motor vehicle. During land travel, cooling air is supplied to the chamber 2 by a fan V and said air enters the body 3 of the vehicle through an opening, not shown, which is formed in said body. Said air is sucked by the fan and leaves the chamber 2 through an opening, which is protected by gratings 4. The chamber 2 contains a partition 5, by which the heat exchange surfaces of the radiator 1 are divided into two sections at least on the cold side. The air supply line 6 opens into a larger compartment 2a, which is disposed on one side of the partition and is provided with flow passages 8, which lead to the outside and are adapted to be closed by valve flaps 7. The smaller compartment 2b is adapted to be shut off from the compartment 2a by a valve flap 9 and is connected to the discharge line 10 coming from a water pump 11 and is provided with a water drain 12. When the vehicle is submerged or floating, the larger compartment 2a is shut off against an ingress of water and only the smaller compartment 2b is flooded.

Figure 2:
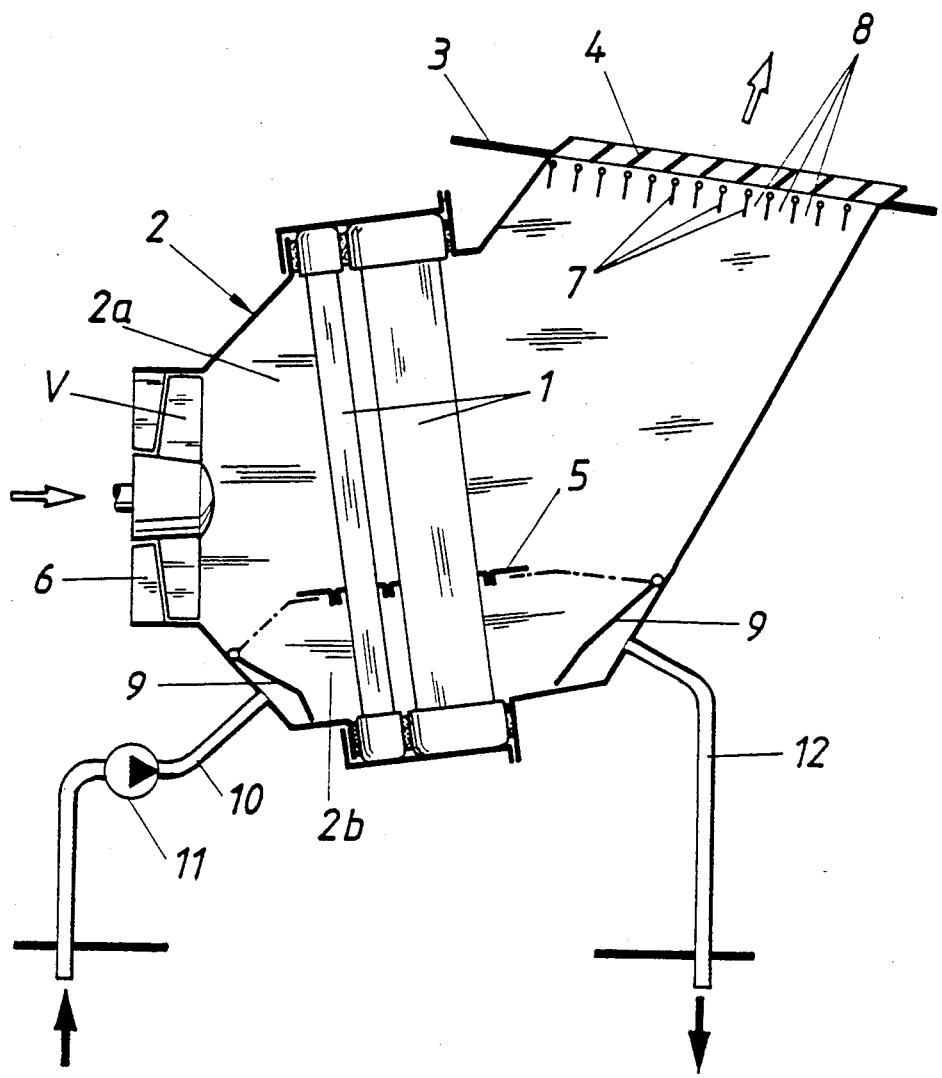
FIG. 2 is a similar view showing a modified cooling system.

The design shown in FIG. 2 differs from that shown in FIG. 1 in that the radiator 1 is substantially vertical and the compartment 2b is provided with two shut-off valve flaps 9. The shut-off valve flaps 9 may be so designed and arranged that in an open position they constitute an air-guiding wall for the cooling air which flows also through the compartment 2b during land travel and that they close the discharge line 10 from the pump and/or the water drain 12 at the same time.

Figure 3:
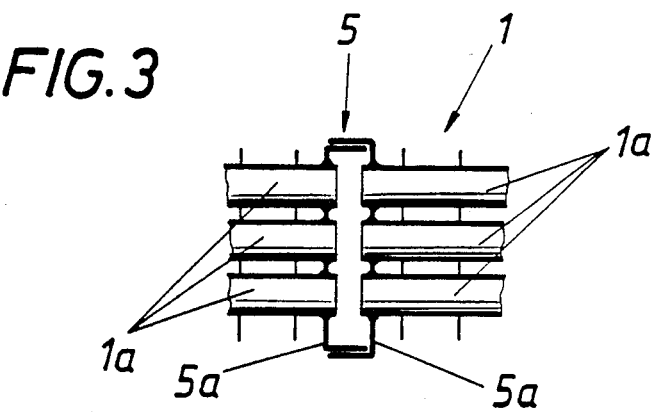
FIG. 3 is a transverse sectional view showing a portion of the radiator with the partition.
Figure 4:
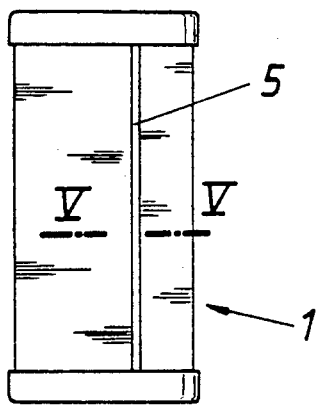
FIG. 4 is an elevation showing a different radiator.
Figure 5:
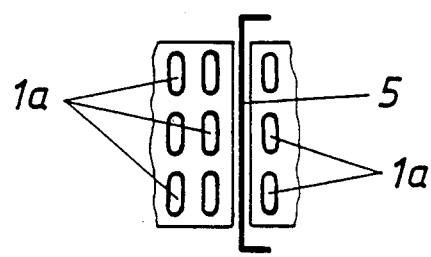
FIG. 5 is an associated transverse sectional view taken on line V—V in FIG. 4.

In accordance with FIG. 3 the partition 5 consists of a closed box and the open ends of tubes 1a, which constitute the two sections of the heat exchange surfaces, are sealed in the broadside walls 5a of the partition 5. Alternatively, the partition 5 may be parallel to the tubes 1a which constitute the radiator and which are preferably connected in parallel, as is apparent from FIGS. 4 and 5.

What is claimed:

1. In a cooling system for cooling a liquid coolant in an immersible motor vehicle, comprising
    a chamber structure defining a chamber,
    inlet means for admitting fluid to said chamber at one end thereof,
    outlet means for delivering fluid from said chamber at the opposite end thereof,
    a radiator disposed in said chamber between said ends thereof and comprising heat exchange surface means having heat exchange surfaces defining on one side a flow path for said liquid coolant and exposed on the other side to said chamber,
    a fan, which is operable to cause air to flow from said inlet means through said chamber in contact with said other side of said heat exchange surface to said outlet means, wherein
    said inlet and outlet means permit also a flow of water through said chamber in contact with said heat exchange surfaces on said other side,
    the improvement residing in that
    a partition is provided, which divides said chamber into first and second compartments and divides said heat exchange surfaces at least on said other side into first and second sections,
    said inlet means comprise an air inlet communicating with said first compartment and a water inlet communicating with said second compartment,
    said outlet means comprise an air outlet communicating with said first compartment and a water outlet communicating with said second compartment,
    outlet valve means are provided for selectively opening and closing said air outlet,
    said first and second compartments communicate with each other through a passage disposed between said air inlet and said radiator,
    a selector valve is provided for selectively opening and closing said passage, and
    said fan is disposed upstream of said passage.

2. The improvement set forth in claim 1 as applied to a cooling system in which said liquid coolant serves to cool an engine of said vehicle.

3. The improvement set forth in claim 1, wherein said first compartment has a larger volume than said second compartment.

4. The improvement set forth in claim 1, wherein
    said partition consists of a closed box having mutually opposite first and second broadside walls exposed to said first and second compartments, respectively, and
    said heat exchange surface means comprise first and second sets of tubes, which are sealed in said first and second broadside walls, respectively, and constitute said heat exchange surfaces.

5. The improvement set forth in claim 1, wherein
    said heat exchange surface means comprise tubes which extend parallel to said partition and constitute said heat exchange surfaces.

6. The improvement set forth in claim 5, wherein said tubes are connected in parallel.

7. The improvement set forth in claim 1, wherein
    a water pump is provided and is connected by a discharge line to said water inlet and
    said second compartment water outlet is a water drain.

8. The improvement set forth in claim 1, wherein
    said selector valve comprises a flap, which is movable between closed and open positions and which in said open position constitutes an air-guiding wall.

9. The improvement set forth in claim 1, wherein
    a water pump is provided and is connected by a discharge line to said water inlet,
    said second compartment water outlet is a water drain, and
    said selector valve comprises a flap, which is movable between closed and open positions and which in said open position constitutes an air-guiding wall and closes at least one of said discharge line and said water drain.

10. A cooling system for cooling a liquid coolant in an immersible motor vehicle, comprising
    a chamber including a partition for dividing said chamber into a first and a second compartment,
    a radiator disposed in said chamber, said radiator including a heat exchange surface for cooling a liquid coolant, said partition dividing said heat exchange surface into first and second sections,
    an air inlet connected to said first compartment, said air inlet operable to allow air to flow into said chamber, said first and second compartments being connected by a passage disposed between said air inlet and said radiator, said first and second sections being cooled by air when said vehicle is not immersed, an air outlet connected to said first compartment for allowing air to pass out of said chamber, a first closing means connected to said air outlet for closing said air outlet when said motor vehicle is immersed, a water inlet connected to said second compartment, said water inlet operable to allow water to flow into said second compartment when said vehicle is immersed, a water outlet connected to said second compartment for allowing water to flow out of said second compartment, and a second closing means for selectively opening and closing said passage, said second closing means being closed and said second section being cooled by water when said vehicle is immersed.

11. The cooling system of claim 10, said liquid coolant serving to cool an engine of said vehicle.

12. The cooling system of claim 10, wherein said first compartment has a larger volume than said second compartment.

13. The cooling system of claim 11, wherein said partition consists of a closed box having mutually opposite first and second broadside walls exposed to said first and second compartments, respectively, and said heat exchange surface means comprise first and second sets of tube which are sealed in said first and second broadside walls, respectively, and constitute said heat exchange surfaces.

14. The cooling system of claim 10, wherein said heat exchange surface means comprise tubes which extend parallel to said partition and constitute said heat exchange surfaces.

15. The cooling system of claim 14, wherein said tubes are connected in parallel.

16. The cooling system of claim 10, comprising a water pump connected by a discharge line to said water inlet, said second compartment water outlet being a water drain.

17. The cooling system of claim 10, wherein said second closing means includes a flap movable between an open and a closed position, said open position constituting an air-guiding wall.

18. The cooling system of claim 10, further comprising a water pump connected by a discharge line to said water inlet, and a water drain connected to said second compartment, water outlet wherein said second closing means includes a flap movable between an open and a closed position, and said open position constitutes an air-guiding wall and closes at least one of said discharge line and said water drain.

19. The cooling system of claim 10, wherein said second closing means includes a pivoting valve flap.

20. The cooling system of claim 10, wherein said closing means includes a first pivoting valve flap located in proximity to said water inlet, and a second pivoting valve flap located in proximity to said water outlet.

* * * * *